United States Patent Office
3,060,209
Patented Oct. 23, 1962

3,060,209
ARYL MERCURY SULFOACYLATES
Carl N. Andersen, Ossining, N.Y.; Dorothy Andersen, executrix of said Carl N. Andersen, deceased
No Drawing. Filed Aug. 10, 1959, Ser. No. 832,458
10 Claims. (Cl. 260—401)

The invention relates to a process for the preparation of aromatic mercury compositions and to products obtained thereby. More particularly, it pertains to the production of water-soluble phenyl mercury composition and includes correlated improvements and discoveries whereby the properties of such compositions are enhanced and the utilization thereof facilitated.

An object of the invention is the provision of a process in accordance with which an organo-mercury composition is prepared by combining an aromatic, e.g. aryl, especially phenyl, diphenyl, tolyl and xylyl mercury compound with a sufo fatty acid with the obtention of a soluble aromatic mercury composition.

A further object of the invention is the provision of a process for the preparation of soluble aromatic mercury compositions wherein an aromatic mercury compound is combined with a saturated sulfo fatty acid.

Another object of the invention is to provide a procedure in which a phenyl mercury compound is solubilized through combination with a saturated sulfo fatty acid. An additional object of the invention is to produce a germicidal preparation containing an aromatic mercury derivative of a saturated sulfo fatty acid having distinctive germicidal value and a sufficiently low toxicity to permit its use with human beings and with higher animals.

A still further object of the invention is the provision of a process for the preparation of soluble aromatic mercury compound which may be readily, effectively and economically carried out to any desired extent.

A more particular object of the invention is to provide a process in which soluble aromatic mercury compositions are produced through a combination of e.g. phenyl mercury acetate or phenyl mercury hydroxide and saturated sulfo fatty acid.

An especial object of the invention is to provide soluble aromatic mercury compositions having the general formula: $(RHg)_xR_1$, in which R represents an aryl grouping in which mercury is directly attached to a carbon atom, $R_1$ is the residue of a product resulting from the reaction between a saturated sulfo fatty acid and an alkaline reacting compound which may be an alkali as the hydroxides of sodium, potassium, calcium, barium, strontium, lithium, ammonium, and magnesium, an alkaline reacting salt as certain phosphates of sodium and potassium and an amine as tri and di-ethanolamines, butyl amine, diethylamine, triethylamine and ethylene diamine, which residue is linked directly to the RHg group, and $x$ is a whole number, usually 1.

A specific object of the invention is to provide a soluble aromatic mercury composition having the general formula: $RHgR_1$, in which R is a phenyl group and $R_1$ has the same meaning as above.

Other objects of the invention will in part be obvious and will in part appear hereinafter.

The invention accordingly comprises the several steps, and the relation of one or more of such steps with respect to each of the others, and the product possessing the features and properties which are exemplified in the following detailed disclosure, and the scope of the invention will be indicated in the claims.

In the practice of the invention, soluble aromatic mercury compositions are produced by the combination of an aromatic mercury compound in which mercury is attached or linked directly to an aryl group containing carbon atoms linked only to hydrogen, carbon and mercury with a saturated sulfo fatty acid and derivatives thereof. The aryl group may be a member of the group consisting of phenyl, diphenyl, tolyl and xylyl and the saturated sulfo fatty acid is one having a carbon content $C_6-C_{18}$ and more particularly lauric, myristic, palmitic and stearic acids.

The amine may be primary, secondary or tertiary, also mono-amines and diamines. These compounds, which also include the hydroxy derivatives, may be butyl amine, dibutyl amine, ethyl hexyl amine, diethylhexylamine ethylene diamine, propylene diamine, morpholine, monoethanolamine, diethanolamine, triethanolamine, monoisopropanolamine, diisopropanolamine, diethylene triamine and triethylenetetramine.

These fatty acid derivatives contain a long hydrocarbon chain which imparts surface active properties to the products. The acids contain a strongly ionized sulfonic acid group and a comparatively weakly ionized carboxylic group. In the first step of preparing these compounds the alkali or amine is added first. It neutralizes the strongly ionized sulfonic group and the final substitution of the phenyl mercury group combines with the carboxyl group. The products vary in color from white, off white, straw color to light brown, depending on the amine used in the preparation of the compound. Those compounds prepared from alkali salts are white.

A typical reaction follows:

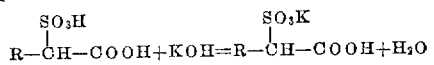

add one mole of phenyl mercury acetate, or hydroxide

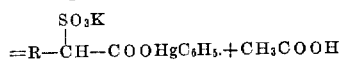

or $H_2O$, or if an amine is used instead of KOH the product is

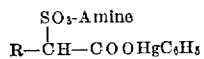

R represents an aryl group in which the mercury is directly attached or linked to a carbon atom.

As an illustrative embodiment of a manner in which the invention may be practiced, the following examples are presented. The monophenyl mercury and the diphenyl mercury salts of sulfostearic acid were prepared in the following manner.

EXAMPLE 1

*Monophenyl Mercury Salt of Sulfostearic Acid*

Dissolve 21 gms. of sulfostearic acid in 166 cc. of hot water and agitate until solution is complete. Add 18 gms. of phenyl mercury acetate. During the first 10 minutes of agitation the mass becomes viscous like a soap gel, but on additional stirring the mass becomes watery. Agitation is continued for 30 minutes until all the phenyl mercury acetate is in solution. The material is extracted in acetone; evaporated to concentrate, and allowed to crystallize. The dry crystals sinter at 70° C.; wet 71°–74° C. and melt at 80°–82° C. The product is fairly soluble in hot alcohol and acetone; slightly soluble in cold water; more soluble in warm water, and soluble in methyl ethyl ketone. Metallic mercury content 5.70%.

EXAMPLE 2

*Diphenyl Mercury Salt of Sulfostearic Acid*

Dissolve 21 gms. of sulfostearic acid in 166 cc. of water heated to 70° C. under agitation. When solution is complete, slowly add 37 gms. of phenyl mercury acetate and agitate for 30–40 minutes. Solution is not complete. The insoluble semi solid is pasty and to make the mass more workable, 100 cc. of water are added and agitation continued. The mixture is allowed to stand over night; filtered; washed with water and acetone and dried. The dry material is extracted in acetone, and crystals readily separate on cooling. Wash with acetone and dry. Product sinters at 88° C.; puffs up in tube at 110°–114° C., and decomposes completely at 116° C. The products formed from phenyl mercury acetate liberate one mole of acetic acid in solution. The pH of the mass gave a value of 2–3 when tested with pH paper. In all reactions of this type, and those which contain an amine or other salt, the odor of acetic acid is noticeable after the completion of the reaction. Metallic mercury content 9.70%. Slightly soluble in cold water; fairly soluble in cold alcohol and acetone, and soluble in methyl ethyl ketone.

EXAMPLE 3

*Phenyl Mercury Triethanolamine Salt of Sulfostearic Acid from Phenyl Mercury Hydroxide*

158 gms. of sulfostearic acid are dissolved in 200 cc. of boiling water. When solution is complete, add 62 gms. of triethanolamine. To this solution, 132 gms. of phenyl mercury hydroxide are added. The latter compound readily dissolves and in 15–20 minutes a thick lustrous, straw colored product results. As the material cools agitation becomes difficult. Solution is complete after agitation, and mixing is complete. Allow the pasty mass to cool. It is readily soluble in alcohol, and the alcohol solution is concentrated. The residue sinters at 95° C., and decomposes at 135°–137° C. The product contains 16.3% metallic mercury, acid is readily soluble in water; alcohol and acetone.

A product prepared by similar procedure which contains 6.46% metallic mercury is a liquid, and a product which contains 9.40% metallic mercury is a semi liquid.

EXAMPLE 4

*Phenyl Mercury Triethanolamine Sulfostearic Acid from Phenyl Mercury Acetate*

41 gms. of sulfostearic acid are added under agitation to 166 gms. of water at 70° C. Agitate until solution is complete; add 42 gms. of triethanolamine and continue agitation. Add 37 gms. of phenyl mercury acetate. Solution results following agitation for 5 minutes. A thin straw colored solution results with a mercury content of 7.00%, and a pH of 6.0.

The mercury content of a product prepared from phenyl mercury acetate is always lower than a product prepared from the hydroxide. The hydroxide has a metallic mercury content of 68% while the acetate content is 59.5%.

EXAMPLE 5

*Phenyl Mercury Ammonium Sulfostearate*

Dissolve in 166 cc. of warm water, 42 gms. of sulfostearic acid, and when solution is complete, add 40 cc. of ammonium hydroxide. A whitish paste forms which is quite soluble in water. Add 33 gms. of solid phenyl mercury hydroxide and agitate until solution is complete; about 15 minutes. Allow to cool and filter on suction. Wash with minimum amount of water. Dry and dissolve in alcohol. Concentrate and allow solid to separate. Dry. The white solid began to sinter in top of melting point tube at 154° C. but no change in bottom of tube. At 175° C., no decomposition or darkening of the ammonium salt. Readily soluble in cold water, alcohol, slightly soluble in cold acetone, readily soluble in hot acetone, partially soluble in methyl ethyl ketone, and soluble in warm ethylene, glycol monoethylether.

EXAMPLE 6

*Phenyl Mercury Sodium Sulfostearate*

Dissolve under agitation 41 gms. of sulfostearic acid in 166 cc. of warm water. When solution is complete, add 4.4 gms. of solid sodium hydroxide. A white cream solid results. To this mass, add 37 gms. of phenyl mercury hydroxide and continue agitation until the latter is completely dissolved. In 20 minutes a creamy white solid results with a mercury content of 9.9%. Allow to cool, filter on vacuum, and dry. Dissolve in acetone, and concentrate filtrate. Solid that separated sinter at 94° C., whitens at 112° C., puffs up and decomposes 118°–119° C.

EXAMPLE 7

*Phenyl Mercury Calcium Sulfostearate*

Dissolve, or suspend, 6.5 gms. of calcium oxide in 166 cc. of warm water. Slowly add 41 gms. of sulfostearic acid. A precipiate results at once as a semisolid mass. Add 37 gms. of phenyl mercury acetate slowly. It immediately solubilizes the calcium precipitate, and forms a white solid which on cooling forms a solid mass in the beaker. This material is slightly soluble in water and alcohol.

The corresponding barium salt was prepared and the resulting product was a semisolid and the precipitate occupied only ½ the volume in the beaker. In the case of the strontium salt, most of the final product was aqueous, and 20% of the total was solid. The barium and strontium salts were fairly soluble in water.

EXAMPLE 8

*Phenyl Mercury Isopropanolamine Sulfopalmitate*

Dissolve 33.6 gms. of sulfopalmitic acid in 166 cc. of warm water. Agitate mixture until solution is complete then add 9 gms. of monoisopropanolamine. A thick reaction mass results. Thirty seven grams of phenyl mercury acetate are added to the mixture and agitated until solution was complete. When the reaction was complete, the mixture was thick and viscous. Allowed to cool forming practically a solid. Air readily occludes in the product, which is readily soluble in alcohol, cold water, acetone and methyl ethyl ketone, and soluble in warm petroleum solvent. The pH value was pH 6.0. Metallic mercury content 9.00%.

EXAMPLE 9

*Phenyl Mercury Diisopropanolamine Sulfopalmitate*

Dissolve 33.6 gms. of sulfopalmitic acid in 166 cc. of warm water, under agitation. When solution is complete add 15 gms. of diisopropanolamine. Solution is complete, the product is one of the most soluble salts similar to the triethanolamine salt. Add 29.4 g. of phenyl mercury hydroxide; agitate for 30 minutes. A thin liquid results which is very soluble in cold water. Metallic mercury content 9.0%. Very soluble in water, alcohol, ethylene glycol monoethylether and methyl ethyl ketone.

EXAMPLE 10

*Phenyl Mercury Diisopropanolamine Sulfostearate*

Add 79 gms. of sulfostearic acid to boiling water 100 cc. Then add 66 gms. of diisopropanolamine and agitate until mixture is uniform even though the mass is completely solid. Add 66 gms. of phenyl mercury hydroxide. The solid mass begins to partially liquefy, and completely dissolves the phenyl mercury hydroxide, Thick tacky solid. Readily soluble in acetone and water. pH 6.0. Metallic mercury content 14.7%. The melting point could not be obtained and a concentrate from acetone was a thick syrup.

EXAMPLE 11

*Phenyl Mercury Butyl, Diethyl or Triethylamine Sulfopalmitate or Stearate*

33.6 gms. of sulfopalmitic acid were dissolved in 166 cc. of hot water under agitation. Add 7 gms. of butyl amine, and a viscous mass results. Add 33 gms. of phenyl mercury hydroxide; the viscosity lessens, and a thin white creamy solution results after 30 minutes' agitation. On cooling the product becomes a very thick and viscous mass. At 50° C. it is soluble in "petroleum" solvent. It is readily soluble in water, alcohol, acetone, methyl ethyl ketone, toluene and cyclohexanol. Metallic mercury content 9.5%.

When 12 gms. of diethyl amine react with 41 gms. of sulfostearic acid in 166 cc. of water and 37 gms. of phenyl mercury acetate added, the final product is a thin pasty brown mass which is very soluble in the solvents mentioned in the case of butyl amine. Mercury content 8.7%.

12 gms. of triethyl amine are allowed to react as above with 41 gms. of sulfostearic acid dissolved in 166 cc. of cold water. Solution results complete in 10 minutes; add 37 gms. of phenyl mercury acetate, and agitate. A thick viscous solution results. On cooling a thick viscous mass results with a mercury content of 8.7%. The pH value is 6.0. The product is very soluble in water, acetone, alcohol, ethylene glycol monoethylether and methyl ethyl ketone.

EXAMPLE 12

*Phenyl Mercury Ethylene Diamine Propylene Diamine Sulfostearate*

Dissolve 41 gms. of sulfostearic acid in 166 cc. of water, and when solution under agitation is complete, add 7 gms. of ethylene diamine. The resulting product is very soluble in water. Add 37 gms. of phenyl mercury acetate, and agitate for 30 minutes. Reaction is slow, and it is only after long agitation that the phenyl mercury acetate has reacted with the formation of a milky suspension on standing over night. Heat applied thickens mixture. The product has a mercury content of 8.7% and a pH value of 6.0. It is completely soluble in water, methyl ethyl ketone, alcohol, acetone and ethylene glycol monoethylether.

When 7 gms. of propylene diamine is added to sulfostearic acid in water solution, a white pasty insoluble compound is first formed which forms a thin syrupy brown liquid on the addition of 33 gms. of phenyl mercury hydroxide, having 9.0% metallic mercury.

EXAMPLE 13

*Phenyl Mercury Morpholine Sulfo-Laurate*

Heat 166 cc. of water to 80° C. and add 10 gms. morpholine and 28 gms. sulfo-lauric acid. The morpholine sulfo-lauric acid is very soluble in hot water. Agitate until reaction is complete and then add 37 gms. of phenyl mercury acetate which goes into solution immediately, and forms a clear solution. On standing over night the mixture solidifies. Mercury content 8.5%, pH 6.0. It forms a milky solution with water; soluble in methyl ethyl ketone; acetone; soluble in hot ethylene glycol monoethylether and soluble in cold alcohol.

EXAMPLE 14

*Phenyl Mercury Monoethanolamine Sulfostearate*

Dissolve 41 gms. of sulfostearic acid in 166 cc. of hot water, and add 14 gms. of monoethanolamine. It does not readily dissolve. The addition of 37 gms. of phenyl mercury acetate causes almost immediate solution. A thick viscous mass results on standing. To half of the product, on cooling, a second mole of monoethanolamine was added, but from the apparent viscosity and the type of jell there was no change with the excess of monoethanolamine.

A brownish jelly formed on cooling in both instances, and the solubilities taken on the sample prepared from one mole gave the following results. Soluble in cold water; soluble in alcohol and methyl ethyl ketone, not soluble in hot toluene but soluble in hot ethylene glycol monoethylether. The mercury content was 8.7% and the pH 6.0.

EXAMPLE 15

Dissolve 41 gms. of sulfostearic acid in 166 cc. warm water and add 12 gms. of 2-amine-2-methyl-1,3-propandiol, $(CH_2OH)_2C(NH_2)CH_3$, M.W. 105. Solution is complete on 10 minutes' agitation. Add 37 gms. of phenyl mercury acetate. Solution is slow on agitation and the mass becomes thick and tacky. On cooling a brown jelly results which is uniform, having pH 6.0 and a mercury content 8.5%. Very soluble in ethyl alcohol, acetone and methyl ethyl ketone.

The compounds of the invention have a high solubility in water hence no solvent other than water is required for their manufacture. Furthermore, the marked water solubility does not influence the germicidal efficiency. Many compounds in the phenyl mercury series have a very low water solubility, varying from 1-1200 to 1-4000, phenyl mercury chloride being practically insoluble. The novel compounds, which are readily soluble in water, have a mercury content of 15%-17% metallic mercury. Bacteriological tests have shown that on an equivalent mercury basis, the phenyl mercury compounds of the sulfo fatty acids are as effective as the relatively insoluble compounds such as phenyl mercury hydroxide and ammonium phenyl propionate.

The bifunctional sulfo fatty acids are prepared by reacting an unsaturated fatty acid having a carbon content $C_6$–$C_{18}$ with sulfur trioxide. Alpha sulfonated acids result. These bifunctional sulfo fatty acids react to give e.g. mono- and di-alkali salts. Salt formation results first and completely at the stronger sulfonic group, leaving the free carboxylic acid group if so desired. The alpha sulfo fatty acids are more soluble in water than their disodium and dipotassium salts, and these salts are more soluble than the monosodium and potassium salts. Lithium and magnesium salts exhibit greater water solubility than the corresponding sodium and potassium salts.

Furthermore, the monophenyl mercury sulfostearic acid is more soluble in water and other usual solvents than the diphenyl mercury sulfostearic acid. When phenyl mercury hydroxide or phenyl mercury acetate is added to a suspension or to a solution of monosodium sulfostearic acid, the insoluble suspension becomes solubilized and that which is in solution changes to a more soluble form. If triethanolamine or diisopropanolamine is used in the place of sodium, a complete water solution results which is straw colored and miscible with most of the common solvents. The properties of the phenyl mercury salts described herein are most unusual. Thus, the compounds that are described in the literature are characterized by insolubility in water and only slight solubility in alcohol. For example, 166 cc. of cold water containing 41 gms. of sulfo-stearic acid by the addition of 33 or 37 gms. of phenyl mercury hydroxide or phenyl mercury acetate directly thereto under agitation leads to immediate solubility and compound formation. The method of preparation has many advantages. First, in most of the preparations, an acid reaction is obtained and if the acetate is employed a pH value of 2–3 results. This is especially advantageous as it is well known that mercury compounds decompose and liberate mercury in alkaline solution whereas in acid solution no decomposition is evident.

Another advantage in the use of the compound of the present invention is that the toxicity of the compounds is very low due to the small amount of compound required to affect microorganism adversely. Further, that no solvent other than water is required contributes to the low toxicity since other solvents may, in many instances, show toxic manifestations such as irritation, swelling and vesication.

It will be apparent that it is possible to prepare these compounds from many of the phenyl mercury compounds available, and excellent results have been obtained with the hydroxide and the acetate. It is advantageous to use a phenyl mercury compound having a high mercury content, in view of the cost factor. Other utilizable phenyl mercury compounds are the lactate, borate, malate, benzoate and salicylate. Moreover, the poly mercurials obtained in the manufacture of phenyl mercury acetate could be used. They are sometimes discarded, but they show effectiveness against various microorganisms similar to the values obtained from other phenyl mercury compounds compared on an equal metal basis.

The compounds do not have any odor, whereas many phenyl mercury compounds prepared today have an ammonical or other strong odor due to the solvent. For use in agriculture, the solvent would have a deleterious effect. These compounds can be used for example for slime control in paper manufacture and other cellulosic products; as an apple spray; for wood preservation; as herbicides, and since they foam and possess surface active properties characteristic of the fatty acid group, they may be used also in the preparation of germicidal soaps; toothpaste; ointments, and similar compositions. Moreover, they may be used to prevent mildew formation in various types of paint and also in rubber, textiles and for general disinfection.

The phenyl mercury sulfo fatty acid compounds are characterized by distinctive potency as germicides. Tests to demonstrate their efficiency relative to *Staphylococcus aureus* were carried out under the following conditions. Solutions of dilutions from 1–100 upward until action ceased were made.

These dilutions were employed in the agar plate test as per Circular #198, U.S. Food and Drug Administration, "Method of Testing Antiseptics and Disinfectants," pages 12–13. The organism was incubated for 24 hours at 37° C.

AGAR PLATE TESTS
*Staphylococcus aureus*

| Compound | Dilution | Zone of Inhibition 24 hrs. incubation |
|---|---|---|
| Phenyl mercury triethanolamine sulfostearate acid | 1–100 | 12 mm. zone. |
| | 1–1,000 | 10 mm. zone. |
| | 1–10,000 | 4 mm. zone. |
| | 1–100,000 | 0–1 mm. zone. |
| | 1–1,000,000 | no zone. |
| Phenyl mercury hydroxide, equivalent mercury basis | 1–100 | 14 mm. zone. |
| | 1–1,000 | 11 mm. zone. |
| | 1–10,000 | 4 mm. zone. |
| | 1–100,000 | 0–1 mm. zone. |
| | 1–1,000,000 | no zone. |
| Phenyl mercury triethanolamine sulfostearate | 1–100 | 10 mm. zone. |
| | 1–1,000 | 6 mm. zone. |
| | 1–10,000 | 4 mm. zone. |
| | 1–100,000 | 1 mm. zone. |
| | 1–1,000,000 | no zone. |
| Phenyl mercury ammonium propionate, equivalent mercury basis | 1–100 | 9 mm. zone. |
| | 1–1,000 | 7 mm. zone. |
| | 1–10,000 | 3 mm. zone. |
| | 1–100,000 | 1 mm. zone. |
| | 1–1,000,000 | no zone. |

Higher percentages of the triethanolamine mono phenyl mercury fatty acid salts are not possible as the material becomes so thick that it is not workable.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A composition of matter having the general formula $$(RHg) \cdot R_1$$

wherein R is an aryl moiety selected from the group consisting of phenyl, tolyl and xylyl linked by one of its carbon atoms to the mercury, $R_1$ is an alpha sulfo saturated fatty acid radical having from about 6 to about 18 carbon atoms, the carboxyl residue of which is linked to the mercury, the composition being soluble in water, alcohol, acetone, methylethyl ketone, and ethylene glycol monoethylether.

2. A composition of matter having the general formula $$(RHg) \cdot R_1$$

wherein R is a phenyl group linked by one of its carbon atoms to the mercury, $R_1$ is an alpha sulfo saturated fatty acid radical having from about 6 to about 18 carbon atoms, the carboxyl residue of which is linked to the mercury, the composition being soluble in water, alcohol, acetone, methylethyl ketone, and ethylene glycol monoethylether.

3. The composition of claim 2 wherein the sulfo group of the alpha sulfo saturated fatty acid radical is neutralized with an alkaline reacting compound.

4. The composition of claim 3 in which the alkaline reacting compound is an amine.

5. The composition of claim 2 wherein the alpha sulfo saturated fatty acid radical is an alpha sulfostearic acid radical.

6. Monophenyl mercury sulfostearate.
7. Diphenyl mercury sulfostearate.
8. Phenyl mercury triethanolamine sulfostearate.
9. Phenyl mercury diisopropanolamine sulfostearate.
10. Phenyl mercury isopropanolamine sulfopalmitate.

References Cited in the file of this patent
UNITED STATES PATENTS

| | | |
|---|---|---|
| 2,113,566 | Anderson | Apr. 12, 1938 |
| 2,162,211 | Anderson | June 13, 1939 |

| Sulfo Fatty Acids | Melting Point, °C. | Molecular Weight | Molecular Weight Monophenyl Mercury Compound | Molecular Weight Diphenyl Mercury Compound | Molecular Weight Triethanolamine Monophenyl Mercury Compound | Percent Hg Triethanolamine Compound Theory | Percent Hg Triethanolamine Compound Highest Commercially Possible |
|---|---|---|---|---|---|---|---|
| Stearic | 92–95 | 364 | 640 | 916 | 767 | 26 | 16–17 |
| Palmitic | 84–88 | 336 | 612 | 888 | 739 | 27 | 16–17 |
| Myristic | 75–77 | 308 | 584 | 860 | 711 | 28 | 16–17 |
| Lauric | 66–69 | 280 | 556 | 832 | 683 | 29.4 | 16–17 |